Figure 8:
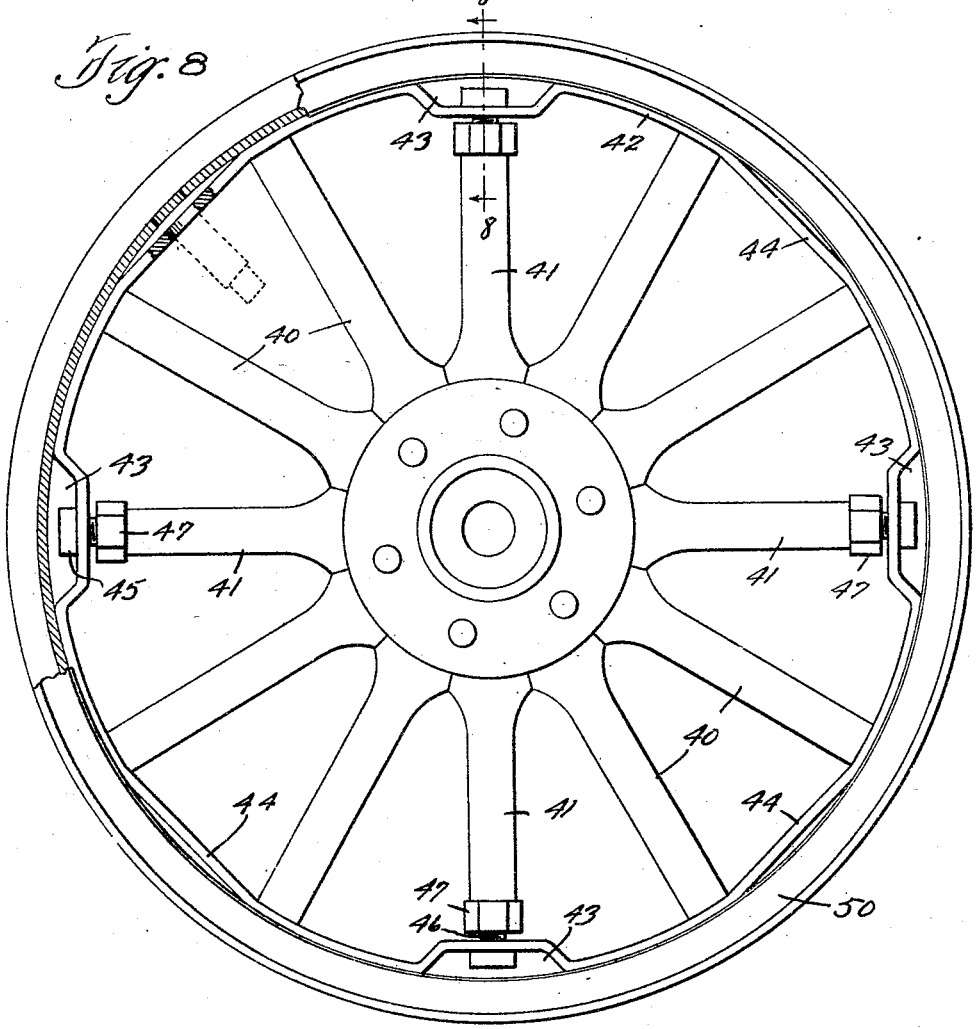

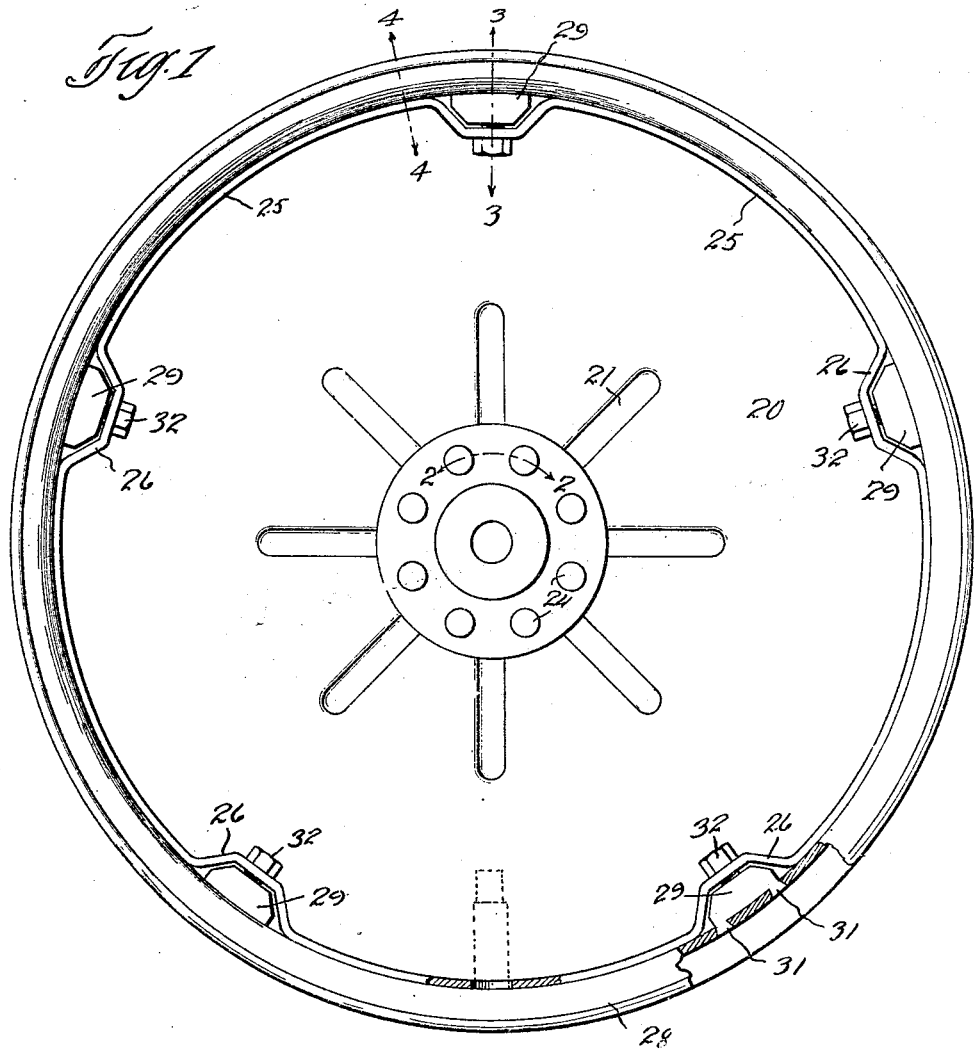
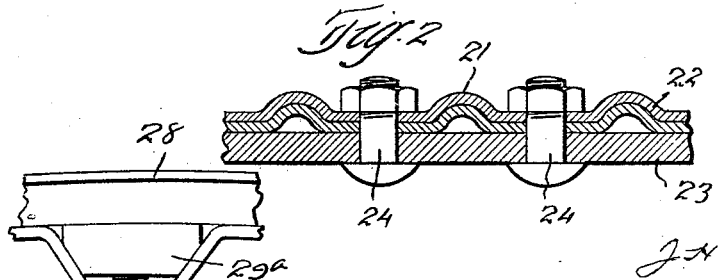

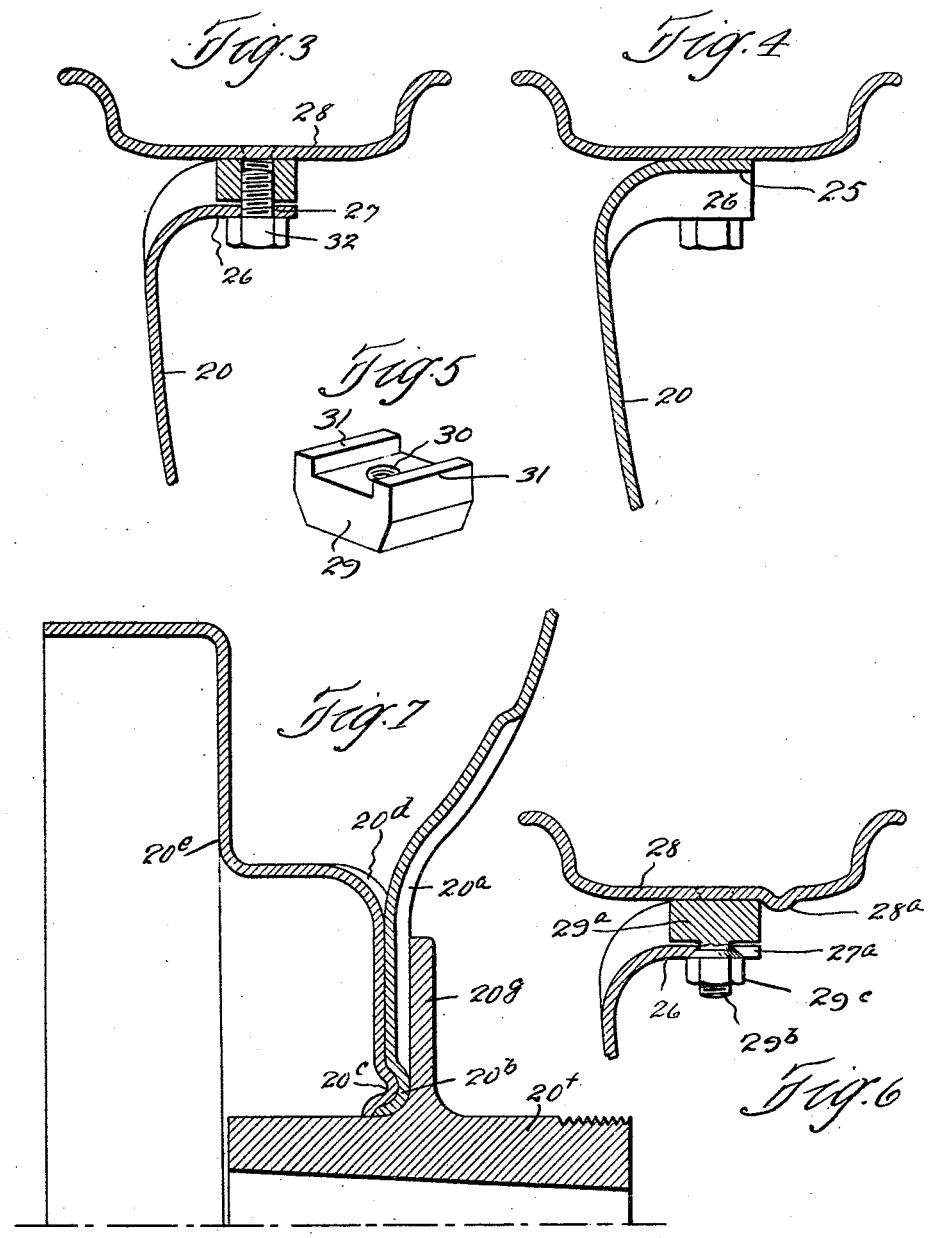

June 22, 1926. 1,589,448
J. H. WAGENHORST
AUTOMOBILE WHEEL
Filed Sept. 23, 1922 6 Sheets-Sheet 3

Inventor
J. H. Wagenhorst
By
Hull Brock & West
Attys.

June 22, 1926.
J. H. WAGENHORST
1,589,448
AUTOMOBILE WHEEL
Filed Sept. 23, 1922
6 Sheets-Sheet 4
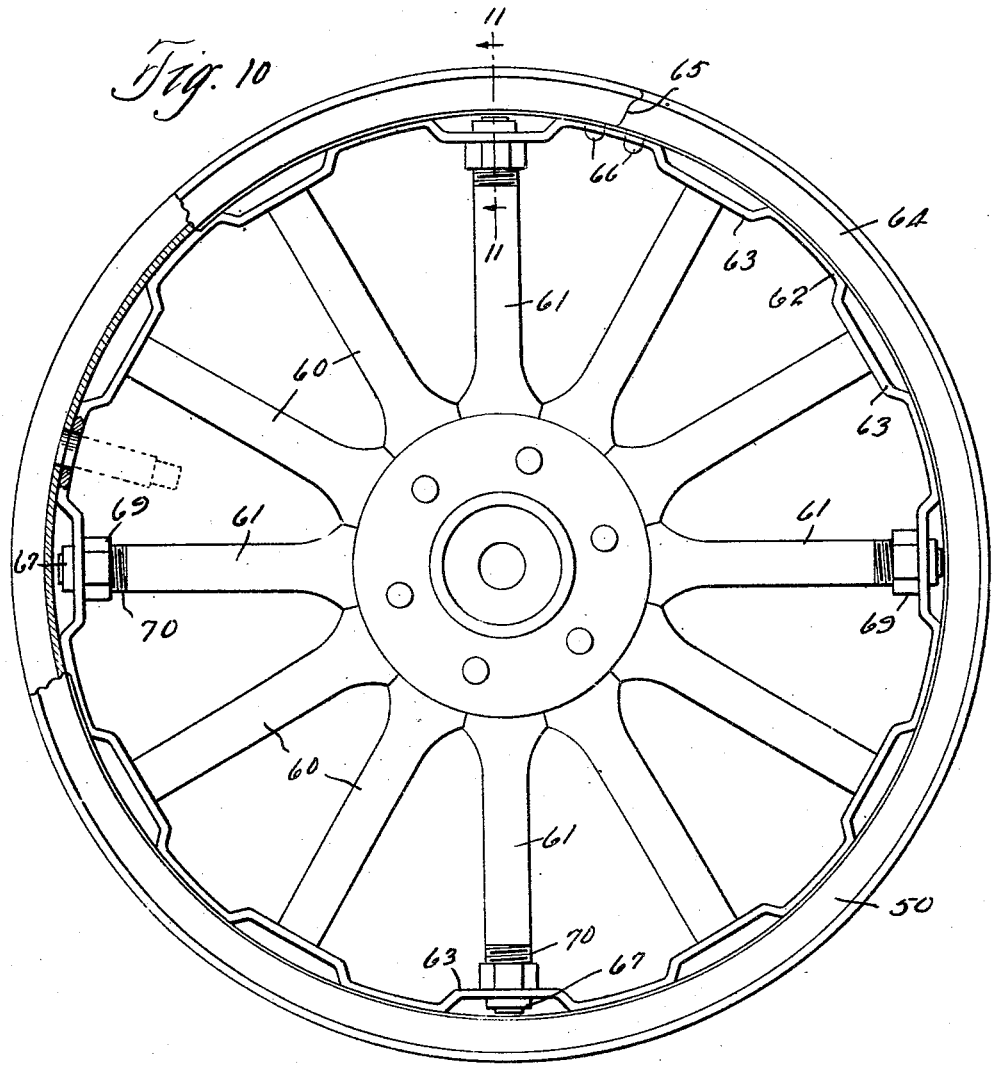
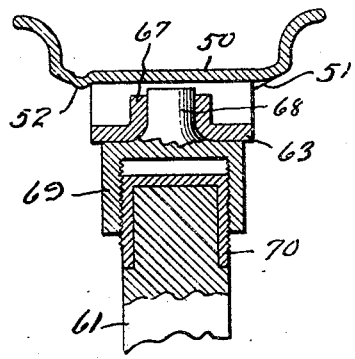
Inventor
J. H. Wagenhorst
By Hull Brock + West
Attys.

June 22, 1926.
J. H. WAGENHORST
AUTOMOBILE WHEEL
Filed Sept. 23, 1922
1,589,448
6 Sheets-Sheet 5
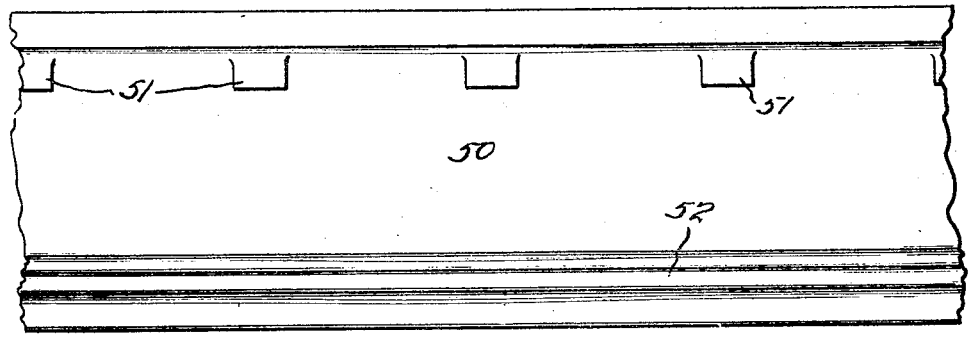
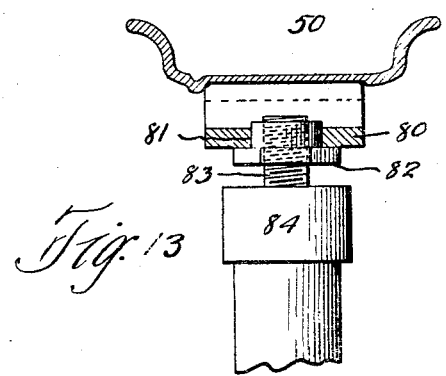
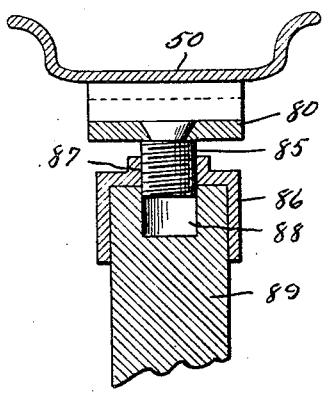
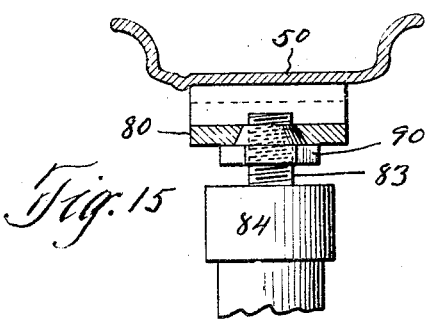

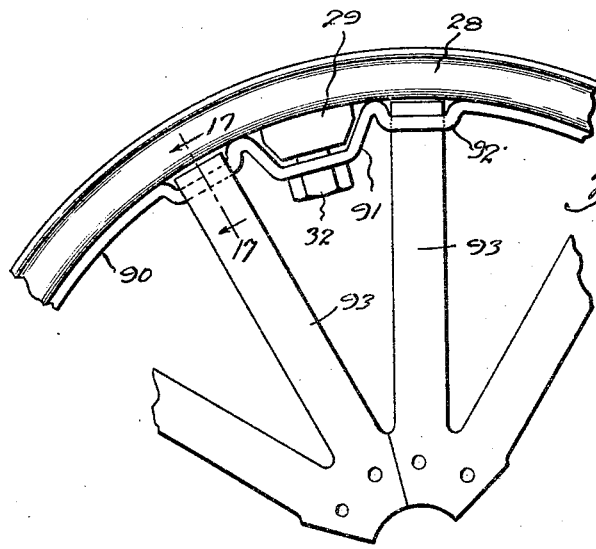
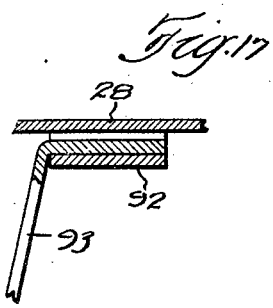
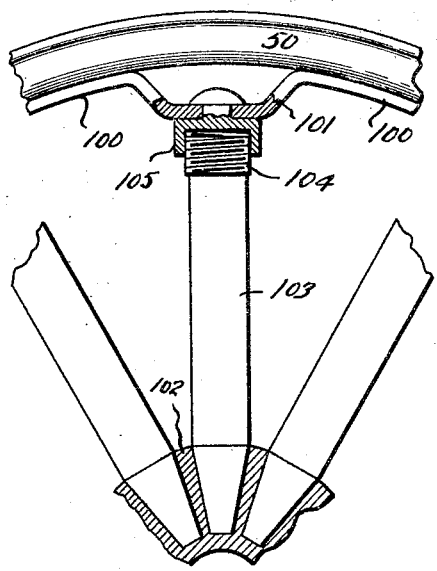
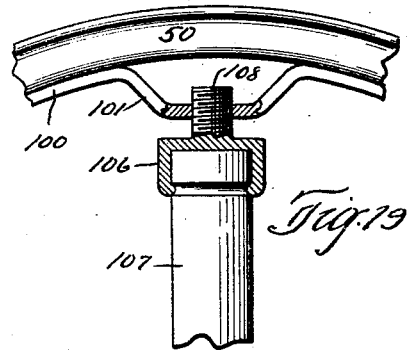

Patented June 22, 1926.

1,589,448

UNITED STATES PATENT OFFICE.

JAMES H. WAGENHORST, OF JACKSON, MICHIGAN.

AUTOMOBILE WHEEL.

Application filed September 23, 1922. Serial No. 589,983.

This invention relates generally to automobile wheels and rims and more particularly to a novel construction of wheel body and demountable tire carrying rim constructed for cooperation with one another whereby the rim can be quickly and easily connected to or disconnected from the wheel body.

The object of the invention is to utilize and adapt the cooperative principle to disk wheels and spoked wheels either of the wooden spoke type, metal spoke type or the tensioned strip spoke type.

As usually constructed, automobile wheels have a substantially rigid peripheral portion upon which is mounted the demountable tire carrying rim, and some type of rim fastening device is employed for fastening said rim upon the wheel body and also tensioning the tire carrying rim.

It has also been proposed in some instances, to provide an expansible and contractible wheel body which can be contracted sufficiently to receive a demountable tire carrying rim thereon and then expand the wheel body so as to provide a locking engagement between the wheel body and rim; but in such instances either the peripheral portion is divided or consists of separate elements such as extensible spokes for supporting the demountable tire carrying rim.

In my construction, which, as before stated is applicable to both disk and spoke wheels and also tensioned strip spoke wheels, I avoid the division of the peripheral portion, and I also provide substantially continuous contact for the rim as opposed to carrying the rim upon the ends of the spokes, but the principle of the invention can be applied to a divided peripheral portion.

My invention can also be applied in several different ways, such as expanding the peripheral portion of the wheel body within the rim by the application of radial outwardly directed force, or by moving the peripheral portion of the wheel body toward the rim simultaneously with the drawing of the rim toward the wheel body and expanding the peripheral portion of the wheel body during such drawing actions.

The invention consists in the novel features of construction and in the manner of combining or arragement of same and whereby the principles hereinbefore referred to are utilized, all of which will be fully described hereinafter as set forth in the appended claims.

Figure 9:
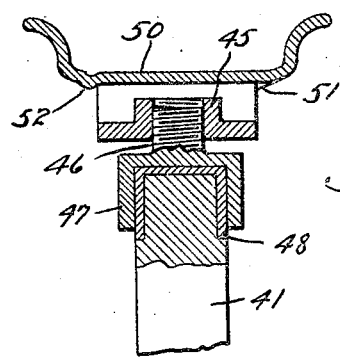

In the drawing forming a part of this specification, Fig. 1 is a face view of a disk wheel embodying one form of my invention and having a demountable tire carrying rim embodying my invention applied thereto, a portion of the rim and wheel body being shown in section; Fig. 2 is a detail sectional view taken on the line 2—2 of Fig. 1; Fig. 3 is a sectional view on the line 3—3 of Fig. 1; Fig. 4 is a sectional view on the line 4—4 of Fig. 1; Fig. 5 is a detail perspective view of one of the lugs attached to the demountable tire carrying rim; Fig. 1ª is a detail elevation of a modified form of lug and rim; Fig. 6 is a detail perspective view showing a slight modification of the rim and peripheral portion of the wheel body; Fig. 7 is a detail sectional view showing a portion of the disk and the brake drum connected to the hub of the rear wheel; Fig. 8 is a face view of a wheel body comprising wooden spokes and a metallic peripheral portion and a demountable tire carrying rim connected thereto, a portion of the rim being shown in section; Fig. 9 is a detail sectional view on the line 8—8 of Fig. 8; Fig. 10 is a face view of a wheel body comprising spokes either of wood or metal and provided with a slightly modified construction of metal peripheral portion and a tire carrying rim arranged thereon; Fig. 11 is a detail sectional view on the line 11—11 of Fig. 10; Fig. 12 is an interior face view of the demountable tire carrying rim shown in Fig. 11; and Figs. 13, 14 and 15 are detail sectional views showing modified forms of means for expanding and contracting the peripheral portion of the wheel body; Fig. 16 is a detail view showing the application of my invention to a wheel body comprising metal strip spokes; and Fig. 17 is a detail sectional view on the line 17—17 of Fig. 16; 18 is a detail view showing the application of my invention to a wheel body comprising tubular metallic spokes; and Fig. 19 is a view showing a slight modification thereof.

Referring particularly to Figs. 1 to 7, 20 indicates a metallic disk preferably formed at the center with radial corrugations 21, and if desired a reinforcing disk or plate 22 also provided with radial corrugations may be employed, and this reinforcing disk or plate is connected to a hub flange 23 by means of bolts or rivets 24.

The disk 20 is formed with an outwardly projecting flange 25 and at regular or definite intervals this peripheral flanges 25 is pressed inwardly at 26, each inpressed portion 26 being apertured at 27, but in the construction shown in Fig. 6 the inwardly pressed portion is slotted as shown at 27ª.

The wheel body may thus be described as having a continuous or unbroken corrugated peripheral rim receiving portion, and upon this continuous peripheral rim receiving portion there is mounted a tire carrying rim 28, which may be of a straight side or clincher type as preferred, and the base thereof may be flat as shown in Figs. 3 and 4, or it may be provided with an inwardly projecting bead or rib 28ª as shown in Fig. 6.

Attached to the tire carrying rim 28 at definite intervals are the lugs 29 tapering toward the center of the wheel as shown, there being a central threaded aperture 30 in each lug.

These lugs are preferably formed from a rolled bar or section, cut to the desired dimension, and when so cut have the outwardly projecting portions 31 which are passed through openings formed in the base of the rim and riveted down in order to securely attach the lugs to the tire carrying rim.

These lugs 29 are so spaced that when the rim is placed upon the wheel body these inwardly projecting lugs will fit within the inpressed or corrugated portions of the peripheral flange of the wheel body and bolts 32 are passed through the openings 27 in the peripheral flange and screwed into the threaded openings 30 in the lugs 29 and after these bolts are screwed into the lugs, the heads thereof come into contact with the peripheral flange of the wheel body and as the screwing operation continues there is a tendency to distort the incontractible tire carrying rim and also to expand the peripheral flange of the wheel body inasmuch as the inpressed portion 26 tends to straighten out, and in so doing there is a tendency to expand the flange in both directions from the center of the inpressed portion and as a consequence of this movement of the peripheral flange outwardly, and the incontractibility of the tire carrying rim, said rim and flange will become fastened together, and the size and shape of the inpressed portion of the peripheral flange, and likewise the size and shape of the inwardly projecting lugs are such as to provide sufficient clearance therebetween to permit this relative movement in order to accomplish the fastening operation.

In the construction shown in Fig. 6 the lug 29ª is formed with an inwardly projecting threaded stud 29ᵇ and a nut 29ᶜ is screwed upon the end thereof, the stud fitting into the slot 27ª produced in the inpressed portion of the peripheral flange and by tightening up on the nut the fastening operation is accomplished in exactly the same manner as when the bolt 32 is screwed into the apertured and threaded lug 29.

In the construction shown in Fig. 1ª the lugs 29ᵈ are of such width that they may come in contact with the side walls of the inpressed portion of the peripheral flange and act as a wedge tending to spread such inpressed portions and in so doing, expand the peripheral flange as a whole so that the fastening contact between the peripheral flange and rim is accomplished.

In the wheel body shown in Fig. 8 a series of spokes 40 is employed and also a number of spokes 41, preferably four in number are arranged within the metallic peripheral band 42 which is formed with inpressed portions or corrugations 43 at points opposite the spokes 41 and this metallic peripheral band may be a true circle in other respects, except that it may be made with straight chord portions 44 at definite points and between the spokes 40. The inpressed portions or corrugations 43 are preferably formed with an outwardly extending threaded socket portion 45 into which screws the threaded stud 46 carried by the cap 47, which in turn fits upon the end of the spoke 41, the latter preferably being provided with a ferrule 48.

The rim 50 may be of the clincher or straight side type and is preferably provided with stops 51 near the inner side and an inwardly projecting bead or rib 52 near the outer side. No lugs in this instance are employed, the tire rim being fitted upon the peripheral band 42 and this band is then expanded by turning the caps 47 and screws 46 so as to force the inpressed portions or corrugations outwardly and expand the continuous unbroken peripheral band as a whole so as to firmly bind the same against the base of the rim, and the inwardly projecting stops 51 and the inwardly projecting bead 52 will prevent any lateral displacement.

The outer ends of the spokes 40 are connected to the peripheral band in any suitable manner and are not disturbed by the slight expansive movement of the peripheral band.

In the wheel body shown in Fig. 10 a series of spokes 60 and preferably four spokes 61 are arranged within a continuous or unbroken peripheral band 62 which is formed with inpressed portions or corrugations 63, and it will be noted that the outer ends of the spokes 60 contact with certain of these inpressed portions. The peripheral band as a whole is circular in form and the tire carrying rim 64 is arranged thereon and, if desired, this rim may be divided at one point as indicated at 65 and provided with driving lugs 66 which fit into apertures produced in the peripheral band.

The inpressed portions or corrugations 63 are formed with outwardly projecting sockets 67 into which fit the studs 68 carried at the outer ends of the internally threaded caps 69 which screw upon the externally threaded ferrule 70 fitted upon the ends of the spokes 61 and after the tire carrying rim is fitted upon the peripheral band, the nut caps 69 are screwed outwardly, exerting radial outward pressure upon the corrugated portion 63, and tend to straighten out or expand the peripheral band as a whole; and in this manner the rim and wheel body are locked together. The rim may also be provided with stop portions 51 and the inwardly extending rib or bead 52 to prevent radial displacement.

In Figs. 13, 14 and 15, I have shown several modified forms of expanding devices. In Fig. 13 the peripheral band 80 is formed with an opening 81 in which fits a nut 82 which screws upon the stud 83 extending outwardly from the cap 84 and the rim 50 is constructed substantially the same as previously described.

In Fig. 14 the peripheral band 80 has a threaded stud 85 riveted thereto and the cap 86 has a threaded portion 87 to engage the same and a socket 88 is produced in the end of the spoke 89.

In the structure shown in Fig. 15 we have substantially the same parts as shown in Fig. 13 except that the nut is provided with a coned portion which fits into a counterbored hole in the peripheral band 80.

In Fig. 16 the peripheral band 90 has the inpressed portions or corrugations 91 and in addition thereto it also has slight depressions 92 in which fit the ends of the strip spokes 93. The tire carrying rim 28 is provided with lugs 29 the same as previously described and bolts 32 are employed for drawing the tire carrying rim inwardly and forcing the peripheral band outwardly and it is obvious as the peripheral band is expanded for the purpose of accomplishing the binding or fastening operation, that the strip spokes are also tensioned. In this manner, the rim and wheel body are securely connected together and the wheel body tensioned all at the same time, and through the same cooperative devices.

In Fig. 18 the peripheral band 100 is formed with inpressed portions or corrugations 101 and the wheel body consists of a hub 102 and tubular metallic spokes 103 threaded at their outer ends as shown at 104 and a screw cap 105 is swiveled to the corrugation 101, and by turning this screw cap in the proper direction, the peripheral band is either expanded or contracted as desired.

In the construction shown in Fig. 19 the cap 106 is swiveled to the end of the spoke 107 and carries a threaded stud 108 at its outer end for engagement with the threaded aperture produced in the inpressed or corrugated portion 101 of the peripheral band 100.

It will thus be seen that I provide various means for attaching a demountable tire carrying rim to a wheel body by expanding or moving outwardly the continuous peripheral portion of said wheel body towards the incontractible tire carrying rim, and all without affecting the strength and stability of the wheel body itself. When the expanding forces are released the felly will contract and there is thus provided sufficient clearance between the rim and felly to permit the rim to be removed from or applied to the wheel body.

In Fig. 7 I have shown the inner edge of the disk 20 formed with a radial corrugation 20ª and also upset at its inner edge as shown at 20ᵇ and the brake drum 20ᶜ is formed with a corresponding radial corrugation 20ᵈ and upset portion 20ᵉ and the hub 20ᶠ is formed with a flange 20ᵍ against which the disk and offset portion of the brake drum bear.

Having thus described my invention, what I claim is:

1. The combination with a demountable tire-carrying rim, of a wheel body having a continuous rim-receiving periphery, said periphery being expansible and contractible.

2. The combination with a demountable tire carrying rim, of a wheel body having a rim receiving periphery expansible by external force, and capable of inherent retraction.

3. A wheel body having a continuous expansible and contractible rim receiving periphery.

4. A wheel body having a rim receiving periphery expansible by external force and possessing inherent retractibility.

5. The combination with a wheel body having a continuous peripheral rim receiving portion, of a tire carrying rim, and means for holding said rim against circumferential movement, and expanding the peripheral rim receiving portion of the wheel body.

6. The combination with a wheel body having a corrugated rim receiving portion, of a tire carrying rim, and means tending to straighten some of said corrugations to expand the peripheral portion of the wheel body into fastened engagement with the rim.

7. The combination with a wheel body having a corrugated peripheral rim receiving portion, of a tire carrying rim provided with means for positioning said rim with reference to the wheel body, and means for expanding said peripheral portion and locking said peripheral portion and tire carrying rim together, 8. The combination with a wheel body having a corrugated rim receiving portion, of a tire carrying rim and means for positioning said rim upon the wheel body, means for expanding said peripheral portion and locking the rim and wheel body together, the peripheral portion of the wheel body possessing inherent retractibility.

9. The combination with a wheel body having a corrugated rim receiving portion, of a demountable tire carrying rim, means for positioning said rim upon the wheel body, means for forcing the peripheral portion expansively outwardly.

10. The combination with a wheel body having a corrugated peripheral rim receiving portion, of a demountable tire carrying rim provided with means for positioning the same from the wheel body, and means for expanding the peripheral portion outwardly and toward the rim, said peripheral portion possessing inherent retractibility.

11. The combination with a wheel body having a corrugated peripheral rim receiving portion, of a tire carrying rim having inwardly projecting portions adapted to engage inwardly projecting corrugations of the peripheral portion, and means for exerting an expansive action upon the peripheral portion of the wheel body.

12. The combination with a wheel body having a continuous corrugated peripheral rim receiving portion, of a tire carrying rim, and means for expanding the peripheral portion of the wheel body outwardly.

13. The combination with a wheel body having a corrugated peripheral rim receiving portion, of a tire carrying rim having inwardly projecting portions adapted to engage the inwardly projecting corrugations of the wheel body, and means connecting the inwardly projecting portions of the rim and wheel body and expanding the peripheral portion of the wheel body outwardly.

14. The combination with a wheel body having a corrugated peripheral rim receiving portion, of a tire carrying rim having lugs fitted into said corrugations and bolts passing through the peripheral portion of the wheel body engaging the lugs of the rim whereby the peripheral portion of the wheel body is expanded outwardly.

15. The combination with a wheel body having a corrugated peripheral rim receiving portion, of a demountable tire carrying rim having lugs connected thereto, said lugs being tapered and apertured, and bolts passing through the peripheral portion of the wheel body and engaging the lugs of the rim, there being clearance between said lugs and corrugated portion of the wheel body.

16. The combination with a demountable tire carrying rim, of apertured and tapered lugs connected thereto, said lugs having riveted portions fitted into apertures in the rim base, and a wheel body having a corrugated peripheral portion adapted to receive said demountable tire carrying rim, some of said corrugations being apertured and bolts passing through said apertures and engaging the lugs of the tire carrying rim.

17. The combination with a disk having a peripheral flange, said peripheral flange being pressed inwardly at definite points, of a tire carrying rim having inwardly projecting lugs adapted to fit into the inpressed portions of the peripheral flange, and means for connecting said flange and lugs, whereby the flange is expanded outwardly against the tire carrying rim.

18. The combination with a wheel body having a corrugated rim receiving band, of a demountable tire carrying rim and means carried by the wheel body for exerting radial outward pressure upon the rim receiving band, said band possessing inherent retractibility.

19. The combination with a wheel body embodying a corrugated peripheral band, of a tire carrying rim positioned upon said band and means for expanding and tensioning the wheel body and binding the same into locked relation with the demountable tire carrying rim.

20. The combination of a wheel disk having a peripheral flange with inwardly-extending depressions formed therein at spaced intervals, a demountable tire-carrying rim, a plurality of inwardly-extending lugs attached to the base of said rim and fitting in said depressions, and a plurality of radially-extending bolts extending through holes in said depressions and screwed into said lugs, whereby the screwing up of said bolts distorts said flange into locking engagement with said rim.

In testimony whereof, I hereunto affix my signature.

JAMES H. WAGENHORST.